June 23, 1936.　　F. D. PELTIER　　2,045,491
MILK COOLER
Filed March 1, 1934　　3 Sheets-Sheet 1

INVENTOR
F. D. Peltier
BY
A. Yates Dowell
ATTORNEY

June 23, 1936.　　　F. D. PELTIER　　　2,045,491
MILK COOLER
Filed March 1, 1934　　　3 Sheets-Sheet 2

INVENTOR
F. D. Peltier
BY
ATTORNEY

June 23, 1936.    F. D. PELTIER    2,045,491
MILK COOLER
Filed March 1, 1934    3 Sheets-Sheet 3

INVENTOR
F. D. Peltier
BY
Ayates Dowell
ATTORNEY

Patented June 23, 1936

2,045,491

UNITED STATES PATENT OFFICE 2,045,491

MILK COOLER

Frank D. Peltier, Evansville, Ind., assignor to Servel, Inc., New York, N. Y., a corporation of Delaware Application March 1, 1934, Serial No. 713,439

15 Claims. (Cl. 62—101)

This invention relates to a device for cooling cans of milk or other substance.

One object of the invention is to provide an insulated tank or receptacle for containing water into which cans of milk to be cooled are adapted to be at least partially immersed and with a refrigerating unit for cooling this water bath and consequently the milk cans or other substances.

A further object of the invention is to provide positive circulation of the water, forming the bath in which the articles to be cooled are immersed, in contact with the cooling unit, thus increasing the heat transfer between the water bath and the articles to be cooled.

Another object of the invention is to provide increased heat transfer with decreased surface whereby the refrigerating unit can operate at suction temperatures only slightly lower than the temperature of the water bath, resulting in operation at a high back pressure and consequently obtaining maximum refrigerating capacity.

Another important object of the invention is to provide a construction wherein ready removal and replacement of the unit can be accomplished without breaking any connections, evacuating any part of the system or otherwise altering the system prior to such removal or replacement of the unit.

Another object of the invention is to provide a removable top for a cabinet which top supports the refrigerating unit and in which the cooling element is disposed on the under side of the top in a manner to be protected from injury when the top is removed from the cabinet.

Figure 1:
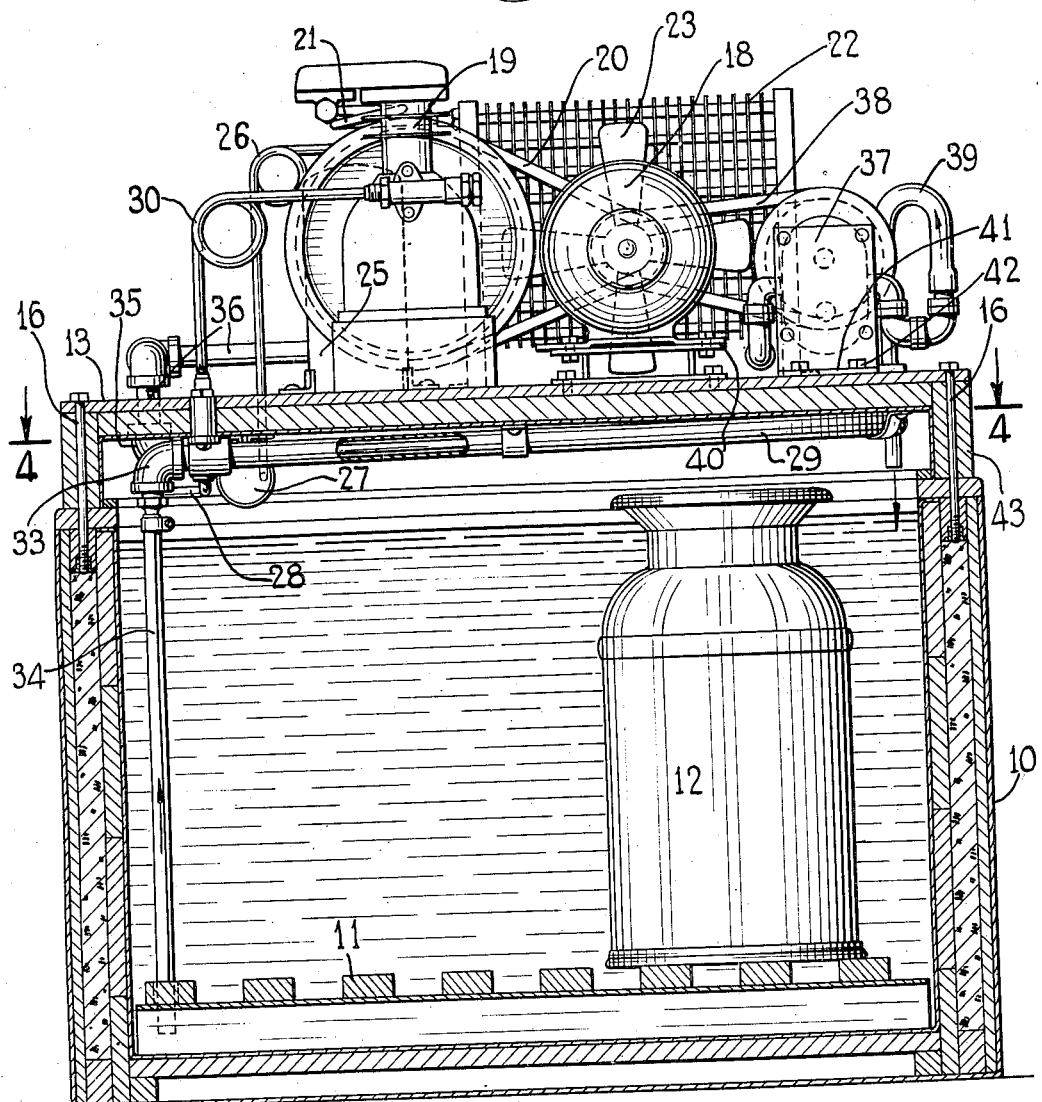
Figure 2:
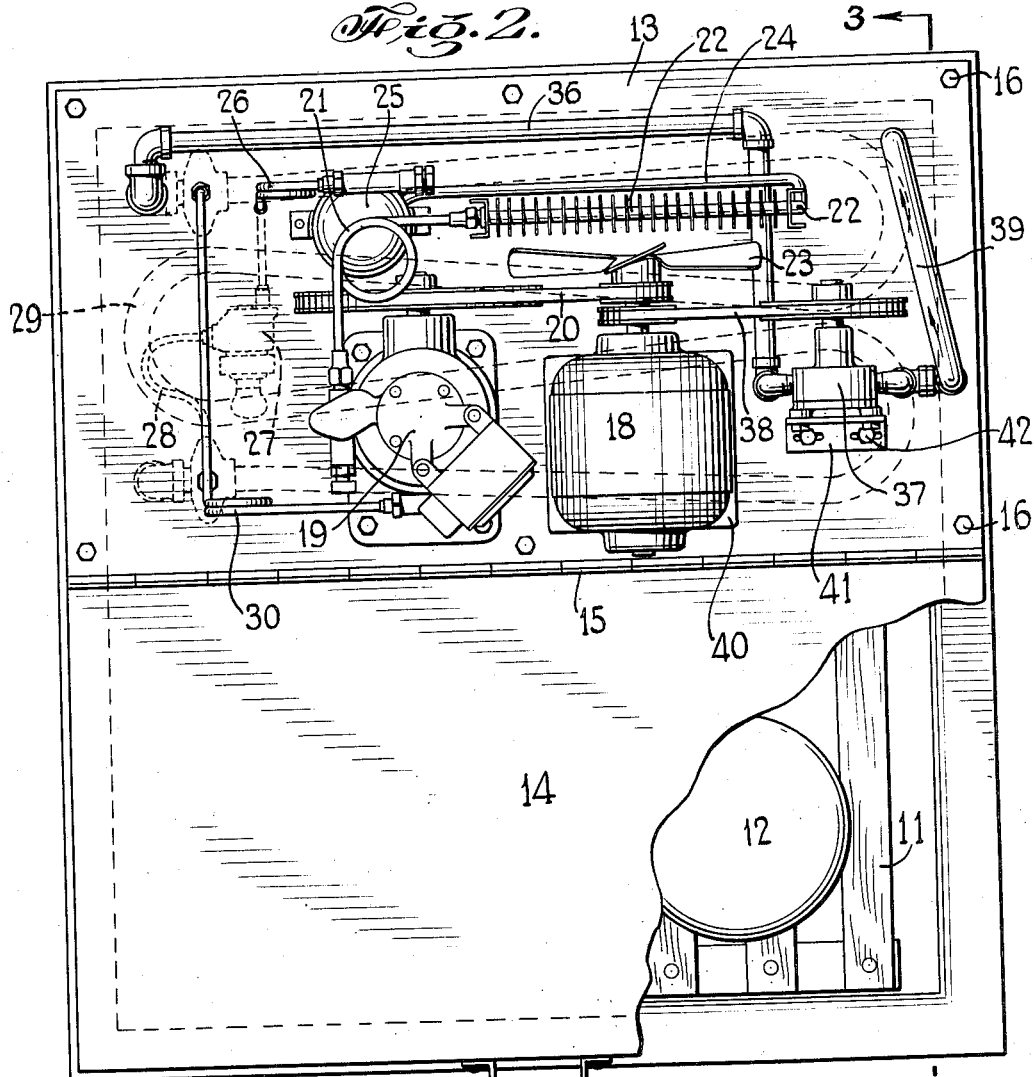
Figure 5:
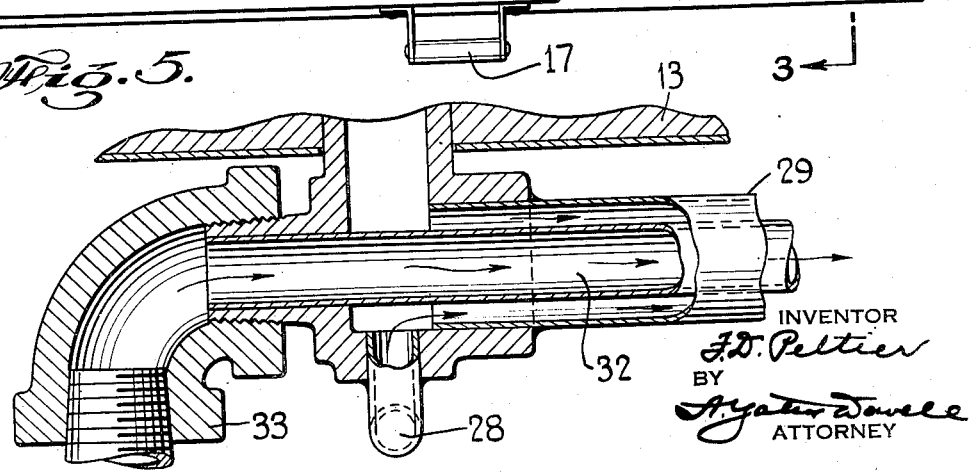
Figure 3:
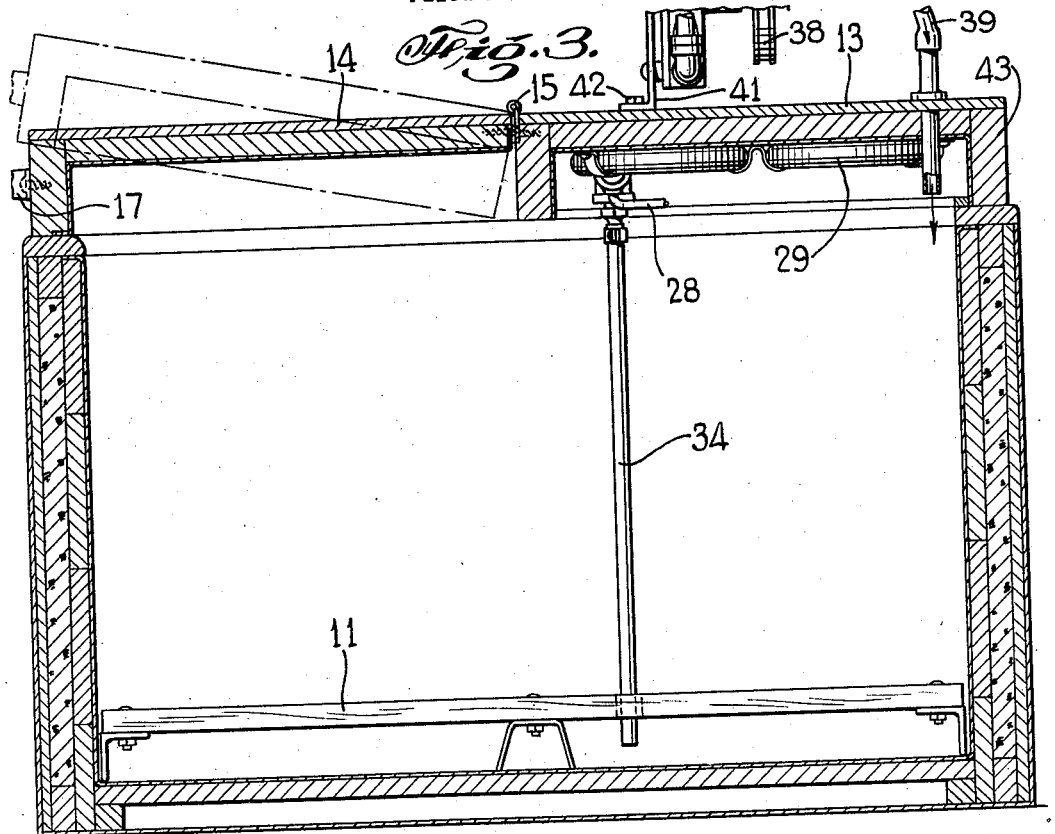
Figure 4:
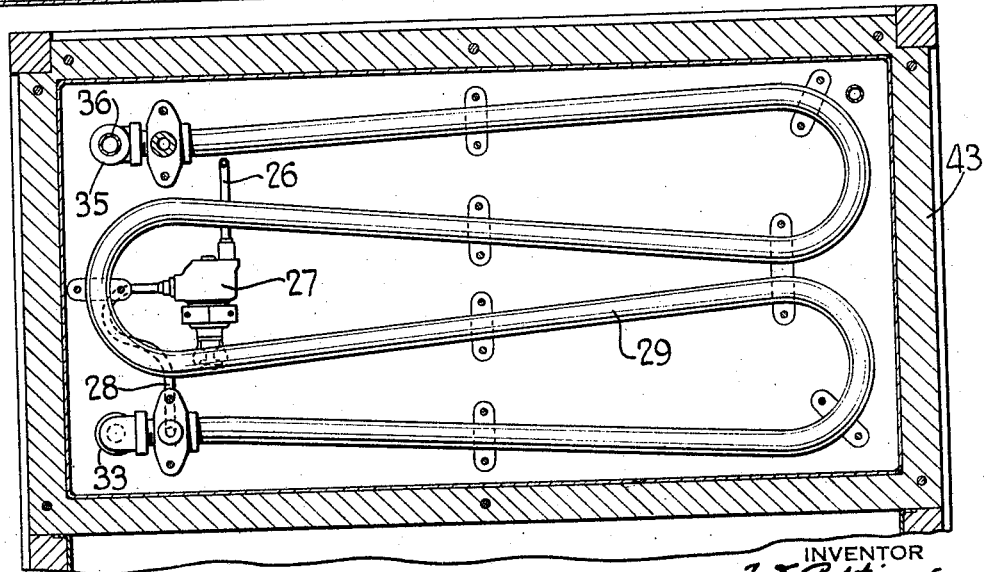

Other objects and advantages will be apparent from the following description taken in connection with the accompanying drawings, wherein Fig. 1 is a vertical section through a receptacle for containing milk cans to be cooled and showing a refrigerating unit in elevation;

Fig. 2, a top plan view with a portion broken away to show a milk can within the receptacle;

Fig. 3, a section on the line 3—3 of Fig. 2;

Fig. 4, a section on the line 4—4 of Fig. 1;

Fig. 5, a fragmentary detail through one of the connections; and

Figure 6:
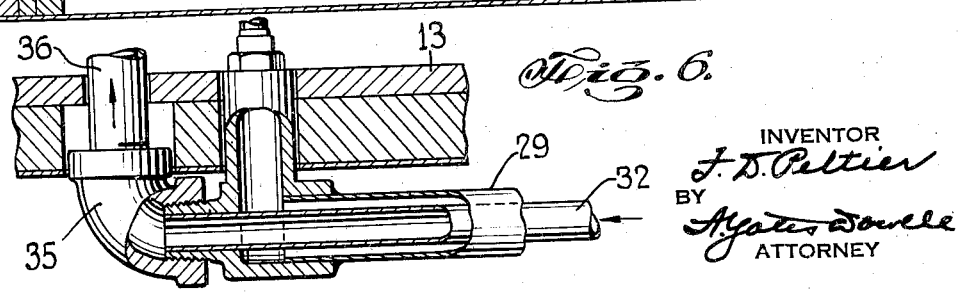

Fig. 6 is a fragmentary view through another of the connections.

Referring to the drawings, an insulated tank or receptacle 10 is provided with a support or grid 11 upon which cans of milk 12 or other articles to be cooled are adapted to be placed. The milk cans are placed upon support 11 in order that they may be held slightly off the bottom of the cabinet to permit free circulation of cooling fluid such as water around and underneath the same. The tank is adapted to be kept filled to a suitable height with water as shown, the height being determined by the height of the milk cans 12, the surface of the water being just below the top of the cans. Instead of water other liquid or brine may be used. Water is quite suitable since it freezes at substantially the same temperature as milk, and it is desired to keep the milk at a temperature slightly above its freezing point in order that it may be most acceptable to the consumer.

A cover for the tank is provided, which cover consists of sections 13 and 14 connected by a hinge 15. The tank and cover form a cabinet for the articles to be cooled. The section 13 is fixedly secured to the tank by means of fastening elements 16 while the section 14 of the cover is provided with a handle 17 so that it may be raised to afford access to the interior of the cabinet.

In order to cool the water in the tank refrigerating apparatus is provided which consists of a motor 18 connected to drive a compressor 19 by means of belt 20. The compressor is connected by means of a pipe 21 with a condenser 22 through which pipe 21 compressed gas is discharged from the compressor. The condenser is constructed to be cooled by air circulated thereover by means of a fan 23 on the shaft of the motor 18. In the condenser 22 the refrigerant gas is adapted to be liquefied and this liquid refrigerant can pass through a pipe 24 from the condenser into the receiver 25. The receiver is connected by a pipe 26 to an expansion valve 27 and through this pipe the refrigerant may pass to the expansion valve. The expansion valve is connected by pipe 28 with the cooling coil 29 and through this pipe refrigerant is adapted to flow to the cooling coil. Water from the cabinet is circulated through the cooling coil and cooled thereby. A suction line 30 connects the coil 29 and the compressor so that the refrigerant vapor may be sucked back to the compressor.

This refrigerating system is constructed to operate between predetermined temperature limits to reduce the temperature of the water in the tank to a point slightly above freezing, at which point the system will stop operating until the temperature of the water in the cabinet has increased a predetermined amount, when it will operate to again reduce the temperature. This intermittent operation is controlled in a well known manner, as for example, by a thermostat the bulb of which is located in the cabinet at a point such that it would be at all times immersed in the water or other liquid contained therein.

In accordance with this invention the refrigerating coil 29 is provided with a water pipe 32 extending centrally through the same, the pipe 32 at one end of the coil 29 being provided with a connection 33 to which is attached a rubber hose 34 or other preferably flexible pipe which extends downwardly into the cabinet preferably to a point slightly below the support 11 and through which water may be drawn into the pipe 32 within the cooling coil. At the other end of the cooling coil the pipe 32 is provided with a connection 35 to which is attached a pipe 36 which extends to a water pump 37 constructed to be driven by means of a belt 38 from the motor 18. The pump 37 is adapted to discharge the water through a pipe 39 back into the cabinet 10. Thus it will be understood that the pump 37 draws the water from the tank 10, causes it to flow through the cooling coil where it is adapted to be refrigerated, and then returns the cooled water to the tank.

The motor 18 is adjustably mounted on its base 40 in order that it can be shifted in relation to the compressor to insure proper tension on the belt 20 which drives the compressor, and likewise the pump 37, which is preferably provided with a metal sheath or insulating jacket, adjustably mounted. The pump 37 is provided with a slotted base 41 held in position by fastening elements 42 in a manner permitting the shifting of the pump in relation to the motor so that proper belt tension may be maintained regardless of the position of the motor, thus insuring a proper tensioning of both belts 20 and 38. The motor and pump are therefore independently adjustably mounted.

The refrigerating unit, as will be readily apparent, is mounted on the upper surface of the fixed half 13 of the cover and the cooling coil 29 and expansion valve 27 are mounted on the under side thereof. The cover is provided with a depending flange 43 of a width to maintain the cooling coil and expansion valve protected if for example the cover is removed and placed on a flat surface.

From the foregoing it will be readily understood that during the operation of the refrigerating unit the cooling coil will be supplied with refrigerant to reduce the temperature of the coil and at the same time the water pump will draw water from the cabinet through the pipe 34 and cause the water to circulate through the pipe 32 centrally through the refrigerating coil and such water will be drawn through the pump and discharged through the pipe 39 and into the cabinet 10.

It will be apparent to those skilled in the art that various other changes may be made in the construction and arrangement without departing from the spirit of the invention, and therefore the invention is not limited to that which is described in the specification and shown in the drawings, but only as indicated in the appended claims.

What is claimed is:

1. A milk cooler comprising a cabinet for containing a liquid in which articles to be cooled are adapted to be placed, a cover for said cabinet provided with a depending flange for spacing the cover slightly above the cabinet, said cover having a portion adapted to be fixed to the cabinet and a movable portion for affording access to the cabinet, a cooling coil mounted on the under side of and a refrigerating unit mounted on the upper side of said fixed portion of the cover and connected in a manner to refrigerate said coil, said refrigerating unit comprising a motor, a liquid coil disposed concentrically of the said cooling coil and having its ends extending downwardly into said cabinet and a pump driven by said motor and connected to said liquid coil for lifting liquid from the cabinet and circulating it through the liquid coil and returning the liquid to said cabinet.

2. A milk cooler comprising a cabinet for containing a liquid in which articles to be cooled are adapted to be placed, a cover for said cabinet provided with a depending flange for spacing the cover slightly above the cabinet, said cover having a portion adapted to be fixed to the cabinet and another portion adapted to be moved for affording access to the cabinet, a cooling coil mounted on the under side of and a refrigerating unit mounted on the upper side of the fixed portion of the cover and connected in a manner to refrigerate said coil, said refrigerating unit comprising a motor, a liquid coil in thermal contact with said cooling coil and a pump driven by said motor and connected to said liquid coil for lifting liquid from the cabinet and circulating it through the liquid coil.

3. A milk cooler comprising a cabinet for containing a liquid in which articles to be cooled are adapted to be placed, a cover for said cabinet, having a portion adapted to be fixed to the cabinet and another portion adapted to be moved for affording access to the cabinet, a cooling coil mounted on the under side of, and a refrigerating unit mounted on the upper side of the fixed portion of the cover and connected to refrigerate the cooling coil, a liquid coil thermally associated with said cooling coil, and means for circulating said liquid through the liquid coil.

4. A milk cooler comprising a cabinet for containing a liquid in which articles to be cooled are adapted to be placed, a cover for said cabinet, a cooling coil mounted on the under side of said cover, a refrigerating unit mounted on the upper side of said cover and connected to the cooling coil in a manner to refrigerate the same, a liquid coil thermally associated with said cooling coil, and means for circulating said liquid through said liquid coil.

5. A milk cooler comprising a cabinet for containing a fluid in which articles to be cooled are adapted to be placed, a cover for said cabinet, a cooling coil suspended from said cover, a refrigerating unit supported by said cover and connected to the cooling coil in a manner to refrigerate the same, and means extending to the bottom of said cabinet for withdrawing fluid and for circulating said fluid in thermal contact with said cooling coil.

6. A device of the class described comprising a receptacle for articles to be cooled, said receptacle being adapted to contain a cooling fluid in which the articles are adapted to be immersed, at least partially, a cover for said cabinet having a fixed and a movable portion and a depending flange for spacing the cover from the cabinet, a cooling coil suspended from the fixed portion of said cover, a refrigerating unit mounted on said cover constructed to refrigerate said cooling coil, said refrigerating unit including a motor for driving the same, a water coil extending centrally through said cooling coil and having its ends extending downwardly into said receptacle, and a pump associated with said cooling coil for withdrawing water from said receptacle and returning it to the same, said pump being driven by said motor, said cooling coil being housed within the confines of the flange on the under side of the fixed section of said cover in a manner to be protected by said flange when the cover is removed from the receptacle and placed on a substantially flat surface, said motor and pump being independently adjustably mounted.

7. A receptacle adapted to contain cooling fluid in which articles to be cooled are adapted to be placed, a cover for said receptacle, a cooling unit suspended from said cover for cooling fluid contained within said receptacle, a refrigerating unit for supplying refrigerant to said cooling unit, a motor for driving said refrigerating unit, a pump for circulating cooling fluid in contact with said cooling unit, said motor and said pump being independently adjustably mounted on said cover, and said motor being arranged to drive said pump.

8. A cabinet including a cover, a cooling coil fastened substantially flat against the under side of said cover, a refrigerating unit arranged to supply refrigerant to said coil, and a liquid circulating coil in thermal contact with said coil, and means for circulating liquid from said cabinet through said circulating coil.

9. A device of the class described comprising a receptacle for containing a cooling fluid in which articles to be cooled are adapted to be placed, a cover for said receptacle comprising a fixed and a movable portion and having a depending flange for spacing the cover above the top of the cabinet, a cooling coil mounted on the under side of the fixed portion of said cover, a refrigerating unit mounted on the upper side of the fixed portion of said cover constructed to refrigerate said cooling coil, said refrigerating unit including a motor for driving the same, a water coil and a pump associated with said cooling coil for withdrawing water from said receptacle and returning it to the same, said pump being driven by said motor, said cooling coil being housed within the confines of the flange on the under side of the fixed section of said cover in a manner to be protected by said flange when the cover is removed from the receptacle and placed on a substantially flat surface, said motor and pump being independently adjustably mounted.

10. A milk cooler comprising a cabinet for containing a liquid in which articles to be cooled are adapted to be placed, a cover for said cabinet provided with a depending flange for spacing the cover slightly above the cabinet, said cover having a portion adapted to be fixed to the cabinet and a movable portion for affording access to the cabinet, a cooling coil mounted on the under side of said fixed portion of the cover, a refrigerating unit connected to the cooling coil in a manner to refrigerate said coil, said refrigerating unit comprising a motor, a liquid coil disposed concentrically of the said cooling coil and having its ends extending downwardly into said cabinet and a pump driven by said motor and connected to said liquid coil for lifting liquid from the cabinet and circulating it therethrough and returning the liquid to said cabinet.

11. A milk cooler comprising a cabinet for containing a liquid in which articles to be cooled are adapted to be placed, a cover for said cabinet provided with a depending flange for spacing the cover slightly above the cabinet, said cover having a portion adapted to be fixed to the cabinet and another portion adapted to be moved for affording access to the cabinet, a cooling coil mounted on said cover, a refrigerating unit connected to said cooling coil in a manner to refrigerate the same, said refrigerating unit comprising a motor, a liquid coil in thermal contact with said cooling coil and a pump driven by said motor and connected to said liquid coil for lifting liquid from the cabinet and circulating it therethrough.

12. A milk cooler comprising a cabinet for containing a liquid in which articles to be cooled are adapted to be placed, a cover for said cabinet, having a portion adapted to be fixed to the cabinet and another portion adapted to be moved for affording access to the cabinet, a cooling coil mounted on the under side of said cover, a refrigerating unit connected to the cooling coil in a manner to refrigerate the same, a liquid coil thermally associated with said cooling coil, and means for circulating said liquid through said liquid coil.

13. A milk cooler comprising a cabinet for containing a liquid in which articles to be cooled are adapted to be placed, a cover for said cabinet, a cooling coil mounted on the under side of said cover, a refrigerating unit connected to the cooling coil in a manner to refrigerate the same and a liquid coil thermally associated with said cooling coil, and means for circulating said liquid through said liquid coil.

14. A milk cooler comprising a receptacle for containing a fluid in which articles to be cooled are adapted to be placed, a removable cover for said receptacle, a cooling coil suspended beneath said cover substantially flat against the underside of the same in the upper portion of the receptacle, a refrigerating unit mounted on the cover and connected to the cooling coil in a manner to refrigerate the same, and means for circulating said fluid in thermal contact with said cooling coil.

15. A cabinet including a cover, a cooling coil fastened substantially flat against the under side of said cover, a refrigerating unit arranged to supply refrigerant to said coil, and means for circulating liquid from said cabinet in heat exchange relation with said cooling coil.

FRANK D. PELTIER.